United States Patent

[11] 3,621,029

[72] Inventors Peter Bamberg;
Bertil Ake Ekstrom; Berndt Olof Harald Sjoberg, all of Sodertalje, Sweden
[21] Appl. No. 849,546
[22] Filed July 15, 1969
Continuation of Ser. No. 603,150, Dec. 20, 1966.
[45] Patented Nov. 16, 1971
[73] Assignee Aktiebolaget Astra
Sodertalje, Sweden

[54] DERIVATIVES OF AMINOPENICILLANIC ACID
10 Claims, No Drawings
[52] U.S. Cl. .................................................. 260/306.7, 260/239.1

[51] Int. Cl. ........................................................ C07d 99/14
[50] Field of Search ............................................ 260/239.1, 306.7

[56] References Cited
UNITED STATES PATENTS
3,249,622   5/1966   Herrling et al. ............... 260/239.1

*Primary Examiner*—Nicholas S. Rizzo
*Attorney*—Brumbaugh, Graves, Donohue and Raymond

ABSTRACT: Esters of 6-aminopencillanic acid as well as a method for their preparation are disclosed. The compounds are useful as intermediates in the preparation of penicillins.

DERIVATIVES OF AMINOPENICILLANIC ACID application is a continuation of application 603,150 filed Dec. 20, 1966.

This invention relates to organic compounds and to their preparation and is particularly concerned with the provision of a new class of esters of 6-aminopenicillanic acid which are of value in the preparation of penicillins.

Only few esters of 6-aminopenicillanic acid have previously been described and all these have drawbacks which render difficult or impossible their use as intermediates in the production of penicillins by acylation of the amino group followed by removal of the ester group. Thus the methyl ester (B. K. Koe, Nature 195 (1962) 1200) is not suitable for use in the preparation of penicillins as the ester group can only be removed by using strong acid or alkaline hydrolysis, which conditions would lead to rapid inactivation of the penicillin (F. P. Doyle and J. H. C. Nayler in N. J. Harper and A. B. Simmonds (Eds.) Advances in Drug Research, Vol. 1, Academic Press, London—New York 1964. Page 25 et seq). The benzyl ester has been used for the preparation of guanidinoacylaminopenicillins (Belgian Pat. No. 634,374), the ester group being removed by catalytic hydrogenation over a precious metal catalyst. The value of this ester as an intermediate is, however, limited as it is prepared by the use of phenyldiazomethane, a reagent known as being extremely dangerous especially when employed on a large scale. Furthermore removal of benzyl groups from penicillins by catalytic hydrogenation is made difficult because the catalyst becomes poisoned (F. P. Doyle, C. R. Foster, J. H. C. Nayler and H. Smith, J. Chem. Soc. 1962, 1440), and large amounts of the expensive catalyst have to be used to carry the reaction to completion. Trialkylsilylesters of 6-aminopenicillanic acid can also be used for the synthesis of penicillins (e.g. K. W. Glombitza, Liebigs Ann. Chem. 673 (1964) 166). Although the trialkylsilyl group is well suited for protecting the carboxylic group of the amino penicillanic acid during the acylation, it is split off very rapidly on contact with water or other hydroxylic solvents with the result that it is impracticable to isolate and purify the primary acylation product by extraction.

Preparation of penicillins by acylation of 6-aminopenicillanic acid has previously generally been carried out by reacting suitable reactive derivatives of the acid appropriate to the desired side chain with an organic or inorganic salt of 6-aminopenicillanic acid in aqueous or organic solutions or suspensions. The products thus obtained are often contaminated with the free acid from which the side chain is derived, which is formed by hydrolysis of the reactive derivative during reaction or during working up and the acid cannot easily be removed, as its physico-chemical properties are similar to those of the penicillin itself. In cases where the side chain contains a basic group, the product may contain as f further impurity unreacted 6-aminopenicillanic acid, which cannot be removed by extraction for the same reason.

The present invention in one aspect provides a novel class of esters of 6-aminopenicillanic acid which are valuable intermediates for the production of penicillins. This class of esters comprises compounds of the general formula:

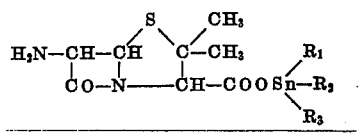

where $R_1$, $R_2$ and $R_3$, which may be the same or different, each represents a monovalent hydrocarbon group, for example an alkyl, aryl or aralkyl group.

The esters of the invention may be converted into penicillins by reaction with an acylating agent capable of introducing the desired side chain on the nitrogen atom, purification of the product, cleavage of the ester linkage and removal of any other protecting groups present. If the side chain of the desired penicillin is neutral, the immediate acylation product of the penicillanic acid ester will also be a neutral compound, which may easily be freed from any acidic or basic impurity by extraction. Acidic groups in the side chain can be protected in the same way as the carboxylic group of 6-aminopenicillanic acid and primary and secondary amino groups can be masked by suitable protecting groups, for example those known per se for this purpose in penicillin syntheses, so that in such cases also the immediate acylation product of the ester is neutral and thus easily purifiable. When a tertiary amine group is present in the side chain, an excess of the acylating agent can be used to ensure complete acylation of the 6-aminopenicillanic acid ester and the acylation product can be freed from excess of acylating agent by treatment at pH 7 with water.

After purification of the acylation product, the ester linkage may readily be cleaved by simple procedures without any appreciable destruction of the penicillin molecule taking place. Cleavage can be brought about by treatment with certain basic or nucleophilic agents in aqueous or nonaqueous solution. In nonaqueous media the penicillin may be obtained directly in crystalline form e.g. as the sodium or potassium salt. The ester group can also be removed by treatment with acid under mild conditions.

According to a further aspect of the invention compounds of Formula I may be produced by reacting 6-aminopenicillanic acid with a compound of the formula

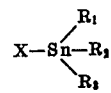
II wherein $R_1$, $R_2$ and $R_3$ are defined as above and X is a lower alkoxy, a lower thioalkyl, a lower dialkylamino, a hydroxyl group or

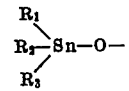

In cases when X is a lower alkoxy, a lower thioalkyl or a lower dialkylamino group the reaction is desirably carried out in an organic solvent e.g. ethyl acetate, benzene or toluene and the temperature is preferably held between 60° and 130° C.

In some cases a procedure using compounds of the formula II, wherein X is a hydroxyl group or

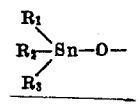

is to be preferred over the other procedure described above. The reaction is desirably carried out in an organic solvent such as benzene, toluene or xylene with removal of the water produced by distillation as it is formed.

Compounds of the general formula I may also be prepared by reacting 6-aminopenicillanic acid or a salt of it, e.g. the sodium, calcium or triethylamine salt, with a suitably substituted triorgano tin halide or cyanide.

The invention is illustrated by the following examples.

EXAMPLE 1

6-Aminopenicillanic acid (21.6 g. 0.1 mole) was stirred in dry boiling benzene (500 ml.) to form a suspension. Bis(tributyltin)-oxide (26 g. 0.05 mole) was added and the mixture was boiled for about 3 minutes. The major part of the benzene was distilled off under reduced pressure (10 mm. Hg). On chilling and addition of about 50 ml. of dry petroleum ether white crystals of the tributyl tin ester of 6-aminopenicillanic acid were obtained. After filtration and washing with dry petroleum ether 45.5 g. of crystals were obtained (90 percent yield) m.p. 81°–2° C.

Analysis

Found: C 47.71, H 7.56, N 5.52, O 9.45, S 6.16 %
Calculated for $C_{20}H_{38}N_2O_3$ SSn: C 47.54, H 7.58, N 5.55, O9.50, S 6.35.

EXAMPLE 2

In an atmosphere of dry nitrogen N-tri-n-butylstannyl-diethylamine (4g. 0.011 mole) was added dropwise to a stirred suspension of 6-aminopenicillanic acid (2.2 g. 0.01 mole) in ethyl acetate (25 ml.), which was distilling slowly. The addition was complete after 20 min. and an almost clear, dark solution had formed. After cooling and filtration the solution was concentrated in vacuo to give 4.4 g. of a glassy residue. The IR-spectrum of the product, dissolved in chloroform, had a strong β-tactam absorption at 1,760 cm.[−1] and contained the same bands as the spectrum of a product prepared as described in example 1.

EXAMPLE 3

Tri-n-butylstannyl methoxide (1.6 g. 0.005 mole) was added to a stirred suspension of 6-aminopenicillanic acid (1.1 g. 0.005 mole) in 25 ml. of slowly distilling benzene. The volume was kept constant by addition of more benzene. After 30 min. an almost clear solution had formed, which after cooling and filtration was concentrated in vacuo to give 2.6 g. of an oily residue, which solidified. A white crystalline product, m.p. 77°–79°, was obtained from benzenepetroleum ether. The identity of this product with the one obtained in example 1 was ascertained by its IR-spectrum.

EXAMPLE 4

Tri-n-butyl(propylthio)tin (1.8 g. 0.003 mole) was added to a stirred suspension of 6-aminopenicillanic acid (1.1 g. 0.005 mole) in toluene (25 ml.) held at about 130° so that the solvent slowly distilled. By gradual addition of more toluene the volume was kept constant. After 1 hour most of the 6-aminopenicillanic acid was recovered by filtration. Concentration of the filtrate in vacuo and treatment of the oily residue with petroleum ether gave a white precipitate (0.15 g.), m.p. 84°–94°.

As shown by its IR-spectrum the product contained the tri-n-butyl tin ester of 6-aminopenicillanic acid.

EXAMPLE 5

Triphenyltin hydroxide (4.3 g. 0.0117 mole) and 6-aminopenicillanic acid (2.53 g. 0.0117 mole) were suspended with stirring in 250 ml. of boiling dry benzene. About 100 ml. of benzene were distilled off at normal pressure. The mixture was filtered and the filtrate was evaporated to about 30 ml. The product was precipitated from the solution with about 100 ml. of petroleum ether white crystals, IR-absorption at 1,750 cm.[−1] (β-lactam) 730 cm.[−1] and 690 cm.[−1] (phenyl).

The product (1 g.) thus obtained was dissolved in 3 ml. of dimethylformamide, potassium thiophenylate (0.26 g.) was added and the mixture was allowed to stand for 30 min. at 20°–25 C. 100 ml. of acetone were added, the precipitation filtered off and washed with acetone. The product proved to be identical (IR) with 6-aminopenicillanic acid potassium salt.

EXAMPLE 6

6-Aminopenicillanic acid (2.16 g. 0.01 mole) was suspended in 300 ml. of boiling dry benzene. Tri-n-propyltin hydroxide (2.65 g. 0.01 mole) was added with stirring and 100 ml. of benzene were distilled off. The mixture was filtered and evaporated in vacuo to abut 30 ml. 100 ml. of petroleum ether were added. The liquid was decanted from the precipitated oil. More petroleum ether was added and decanted at which the product solidified. The solid residue showed strong IR band at 2,960–2,860 cm.[−1] (C—H) and at 1,760 cm.[−1] (β-lactam).

Analysis

Found: S 6.7 %
Calc. for $C_{12}H_{32}N_2O_3$ SSn: S 6.9 %.

EXAMPLE 7

By the same method as given in example 6, 6-amino-penicillanic acid-tri-n-butyl tin ester was obtained from 6-aminopenicillanic acid (2.16 g. 0.01 mole) and tri-n-butyl-tin hydroxide (3.07 g. 0.01 mole) in 300 ml. of benzene. The product melted at 81°–83° C. and proved IR-spectroscopical to be identical with the product obtained according to example 1.

What is claimed is:

1. A class of esters of 6-aminopenicillanic acid of the formula

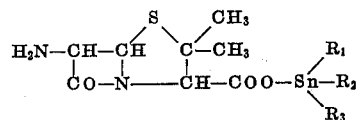

wherein $R_1$, $R_2$ and $R_3$ each is selected from the group consisting of lower alkyl and phenyl.

2. Esters as set forth in claim 1, wherein $R_1$, $R_2$ and $R_3$ are lower alkyl.

3. Esters as set forth in claim 1, wherein $R_1$, $R_2$ and $R_3$ are n-butyl.

4. Esters as set forth in claim 1, wherein $R_1$, $R_2$ and $R_3$ are phenyl.

5. A process for the preparation of esters of 6-aminopenicillanic acid, comprising reacting 6-aminopenicillanic acid with a compound of the formula:

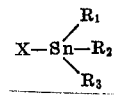

wherein $R_1$, $R_2$ and $R_3$ each is selected from the group consisting of lower alkyl and phenyl radicals, and X is selected from the group consisting of lower alkoxy, lower alkylthio, lower dialkylamino, hydroxy, and

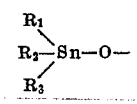

radicals, wherein the lower alkyl chain has at most five carbon atoms, to form a compound of the formula:

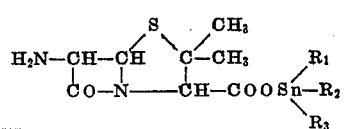

wherein $R_1$, $R_2$ and $R_3$ are defined as above.

6. The process as set forth in claim 5, wherein $R_1$, $R_2$ and $R_3$ are lower alkyl.

7. The process as set forth in claim 5, wherein $R_1$, $R_2$ and $R_3$ are n-butyl.

8. The process as set forth in claim 5, wherein $R_1$, $R_2$ and $R_3$ are phenyl.

9. The process as set forth in claim 5, wherein X is selected from the group consisting of lower alkoxy, lower alkylthio or lower dialkylamino and the reaction is carried out in an organic solvent selected from the group consisting of ethyl acetate, benzene and toluene.

10. The process as set forth in claim 5, wherein X is selected from the group consisting of hydroxy or

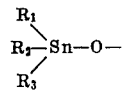

and the reaction is carried out in an organic solvent selected from the group consisting of benzene, toluene and xylene, with removal of the water produced by distillation as it is formed.

* * * * *

UNITED STATES PATENT OFFICE
CERTIFICATE OF CORRECTION

Patent No. 3,621,029      Dated November 16, 1971

Inventor(s) Peter Bamberg et al

It is certified that error appears in the above-identified patent and that said Letters Patent are hereby corrected as shown below:

Column 1, line 52, "f" should be -- a --. Column 3, line 19, "1,760 cm.'7E'1" should be -- 1760 cm$^{-1}$ --; line 47, "84°-94" should be -- 84-94° --; line 59, "1,750 cm.'7E'1 (β-lactam) 730 cm.'7E'1 and 690 cm.'7E'1" should be -- 1750 cm$^{-1}$ (β-lactam) 730 cm$^{-1}$ and 690 cm$^{-1}$ --; line 74, "abut" should be -- about --. Column 4, line 3, "2,960-2,860 cm.'7E'1 (C-H) and at 1,760 cm.'7E'1" should be -- 2960-2860 cm$^{-1}$ (C-H) and at 1760 cm$^{-1}$ --.

Signed and sealed this 23rd day of May 1972.

(SEAL)
Attest:

EDWARD M. FLETCHER, JR.      ROBERT GOTTSCHALK
Attesting Officer      Commissioner of Patents